(12) United States Patent
Jang (10) Patent No.: US 11,248,567 B2
(45) Date of Patent: Feb. 15, 2022

(54) INTAKE STRUCTURE OF VEHICLE AND METHOD OF MOUNTING NIPPLE TO INTAKE STRUCTURE

(71) Applicants: Hyundai Motor Company, Seoul (KR); Kia Motors Corporation, Seoul (KR)

(72) Inventor: Young-Hak Jang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/866,244

(22) Filed: May 4, 2020

(65) Prior Publication Data
US 2021/0239078 A1 Aug. 5, 2021

(30) Foreign Application Priority Data
Feb. 4, 2020 (KR) .......................... 10-2020-0013022

(51) Int. Cl.
*F02M 35/10* (2006.01)
*F01M 11/08* (2006.01)

(52) U.S. Cl.
CPC ...... *F02M 35/10209* (2013.01); *F01M 11/08* (2013.01); *F02M 35/10137* (2013.01); *F02M 35/10144* (2013.01); *F02M 35/10157* (2013.01); *F02M 35/10275* (2013.01)

(58) Field of Classification Search
CPC ....... F02M 35/10209; F02M 35/10144; F02M 35/10137; F02M 35/10275; F02M 35/10157; F01M 11/08
See application file for complete search history.

(56) References Cited

U.S. PATENT DOCUMENTS

2003/0146624 A1* 8/2003 Gotoh ................. F16L 19/0286
285/334.5
2004/0222631 A1* 11/2004 Baxi ..................... F16L 33/025
285/252

FOREIGN PATENT DOCUMENTS

| KR | 1998-0033234 U | | 9/1998 | |
| KR | 20050035349 A | * | 4/2005 | |
| KR | 20080001042 U | * | 5/2008 | |
| KR | 20110023156 A | * | 3/2011 | |
| WO | WO-2007045322 A1 | * | 4/2007 | ............. F16L 11/11 |

* cited by examiner

*Primary Examiner* — Jacob M Amick
*Assistant Examiner* — Charles J Brauch
(74) *Attorney, Agent, or Firm* — Mintz Levin Cohn Ferris Glovsky and Popeo, P.C.; Peter F. Corless (57) ABSTRACT

An intake structure of a vehicle is provided to prevent engine oil from flowing back along a nipple. The structure includes an intake hose which is mounted between an air cleaner and a compressor of a turbo charger. A pocket part, in which the oil comprised in a blow-by gas through the nipple is collected, is formed on the inner sidewall surface of the intake hose. The intake structure prevents the oil existing in the recirculated blow-by gas from flowing into a fresh air nipple.

17 Claims, 9 Drawing Sheets

FIG.1

RELATED ART

INTAKE STRUCTURE OF VEHICLE AND METHOD OF MOUNTING NIPPLE TO INTAKE STRUCTURE

CROSS-REFERENCE TO RELATED APPLICATION

This application claims priority to Korean Patent Application No. 10-2020-0013022, filed on Feb. 4, 2020, which is incorporated herein by reference in its entirety.

BACKGROUND

Field of the Disclosure

The present disclosure relates to an intake structure of a vehicle and a method of mounting a nipple to the intake structure, and more specifically, to an intake structure of a vehicle with a nipple to prevent engine oil from flowing back along the nipple and a method of mounting the nipple to the intake structure, which prevents the oil contained in a blow-by gas from flowing into a fresh air nipple which supplies a fresh air to an engine or a brake booster.

Description of Related Art

Figure 1:
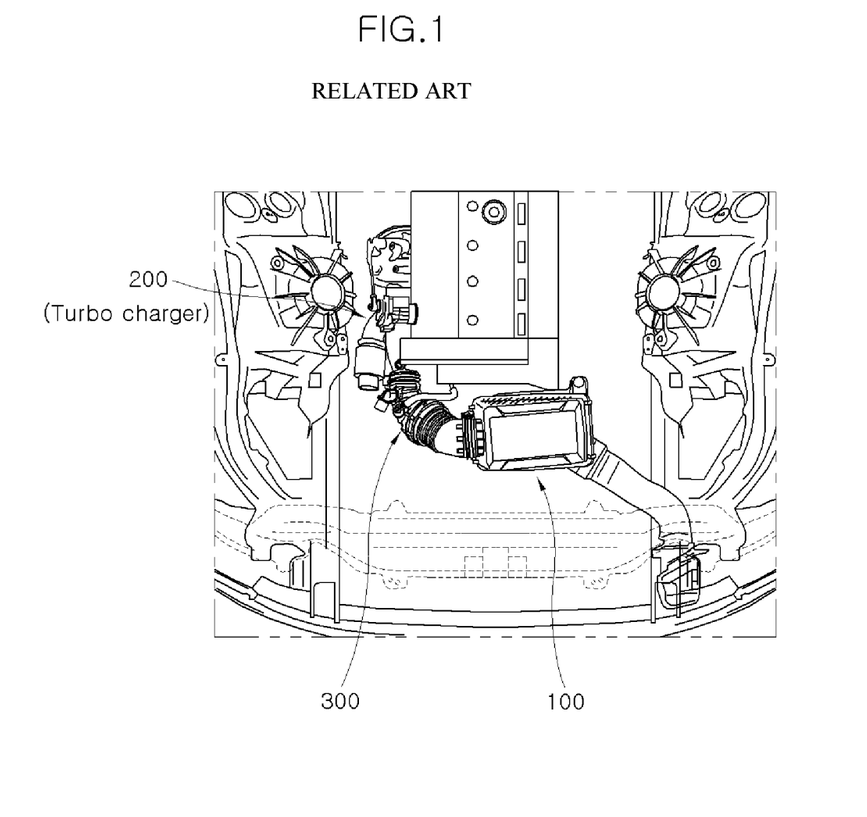
FIG. 1 is an exemplary diagram illustrating an intake line of an engine to which a general turbo charger is mounted according to the related art.

Intake air is supplied to a combustion chamber for combusting fuel. An intake pipe is mounted in the engine for supplying the intake air. As illustrated in FIG. 1 of the related art, the intake pipe includes an intake shield, an intake duct, an air cleaner, and an intake hose. The intake hose is connected to a surge tank, an intake manifold, and the like. As illustrated in FIG. 1, when a compressor of a turbo charger is mounted at the front end of the surge tank or the intake manifold, the compressor of the turbo charger and the intake hose are connected to each other.

When the turbo charger is applied to the engine, a pressure which is equal to or greater than atmospheric pressure is generated between the compressor of the turbo charger and the engine by the operations of a turbine and the compressor configuring the turbo charger. When the opening amount of a throttle valve is minimal, a load greater than necessary may be generated in the throttle valve or the compressor of the turbo charger, and thus, a circulation line which circulates the intake air is mounted between the front end and the rear end of the compressor of the turbo charger. The circulation line is mounted with a pressure-sensitive valve. The pressure-sensitive valve is operated to open when the inner pressure of the circulation line is a particular value or greater, and maintains the locked state when the inner pressure is less than the particular value.

When the opening amount of the throttle valve is reduced during constant speed running or coast running, the inlet pressure of the compressor of the turbo charger may be greater than the outlet pressure thereof. In this case, the compression efficiency of the compressor is reduced, and a part of the intake air flows back along the inner surface of the intake hose which is connected to the compressor.

Meanwhile, during engine operation, a blow-by gas is collected inside a cylinder block through the gap between a piston and a cylinder. When the blow-by gas is excessively collected inside the cylinder block, the engine may not operate normally, and thus, the blow-by gas collected inside the cylinder block is eliminated by being recirculated to the intake pipe.

As illustrated in FIG. 1, when the turbo charger is applied to the engine, a breather nipple is mounted between the compressor and the intake hose to receive the blow-by gas. In addition, a fresh air nipple which supplies fresh air into the cylinder block is mounted to the intake hose to appropriately maintain the inner pressure of the cylinder block, and prevent the blow-by gas from being excessively concentrated.

As described above, when the compression efficiency of the compressor of the turbo charger is reduced, a part of the intake air flows back along the inner surface of the intake hose. The blow-by gas which is recirculated to the intake pipe through the breather nipple may reach the fresh air nipple by the flowing-back intake air. Since the fresh air nipple supplies fresh air into the cylinder block, the blow-by gas is moved back into the cylinder block.

In addition, intake air, exhaust air, mixed air, oil, and the like are present in the blow-by gas. When the blow-by gas flows back, an air cleaner filter may be contaminated by the oil, thereby reducing the engine output. When the oil flows into the fresh air nipple, the fresh air nipple may be clogged. When the fresh air nipple is clogged, it is not possible to prevent the adjustment of the inner pressure of the cylinder block, the excessive concentration of the blow-by gas, and the like. In addition, the fresh air nipple may also be connected to a brake booster, and when the fresh air nipple is clogged by the oil contained in the blow-by gas, the brake may not be operated normally (e.g., may fail or malfunction).

The contents described in this section are merely to help the understanding of the background of the present disclosure, and may include what is not previously known to those skilled in the art to which the present disclosure pertains.

SUMMARY

An object of the present disclosure invented in consideration of the above point is to provide an intake structure of a vehicle with a nipple to prevent engine oil contained in a blow-by gas from flowing back along the nipple and a method of mounting the nipple to the intake structure of preventing the engine oil from flowing back along the nipple.

An intake structure according to an exemplary embodiment of the present disclosure may include an intake hose mounted between an air cleaner and a compressor of a turbo charger, and a pocket part, in which the oil contained in a blow-by gas is collected, may be formed on the inner sidewall surface of the intake hose. In addition, the pocket part may include a volume part fixed to a mounting mount formed on the intake hose, and a bottom part mounted to the end portion of the volume part to seal the volume part, and the volume part may have the depth from the inner sidewall surface of the intake hose to the bottom part.

In addition, a fresh air nipple, which supplies fresh air to an engine in which the blow-by gas is generated, may be mounted to the intake hose. The fresh air nipple may include a connection part disposed outside the intake hose, an extension part that extends from the connection part and is located inside the volume part, and a protrusion part that extends from the extension part into the intake hose. The extension part may penetrate the center of the bottom part and the pocket part and the fresh air nipple may be integrated. The total length of the extension part and the protrusion part may be greater than the depth of the pocket part, and may be less than the radius of the inner diameter of the intake hose.

Further, a projection may be formed on the protrusion part. The projection may be continuously formed on the outer circumferential surface of the protrusion part at a right angle with respect to the longitudinal center axis of the protrusion part. Two or more projections may be formed to have spacing distances from the end portion of the protrusion part toward the inner sidewall surface of the intake hose.

In addition, the end portion of the intake hose may include a buffer part configured to absorb the vibration of the engine, and a perforated resonator may be mounted to the intake hose to approach the buffer part. The perforated resonator may include a tubular body part fixed to the inner surface of the intake hose, and the body part may be formed with a plurality of apertures which penetrate the body part. The perforated resonator may be disposed closer to the air cleaner than the pocket part.

The intake hose may be mounted with a recirculation nipple in which the intake air compressed by the compressor of the turbo charger is recirculated to the intake hos. One side of the compressor of the turbo charger may be mounted with a breather nipple into which the blow-by gas flows and the recirculation nipple may be disposed between the breather nipple and the fresh air nipple. In addition, the recirculation nipple may be mounted to the intake hose to protrude toward the inside of the intake hose. The length of the recirculation nipple which protrudes from the inner sidewall surface of the intake hose may be about 5 mm to 10 mm.

The end portion of the fresh air nipple may be disposed closer to the center portion of the intake hose than the end portion of the recirculation nipple. In addition, the recirculation nipple may be mounted to the intake hose and thus, the end portion of the recirculation nipple disposed inside the intake hose may be inclined closer to the compressor of the turbo charger than the coupled site between the intake hose and the recirculation nipple. In addition, an anti-release projection may be formed on the outer surface of the volume part, and the inner surface of the mounting mount may be formed with a mounting groove which is fastened to the anti-release projection.

A method of mounting a nipple to an intake structure of a vehicle to prevent engine oil from flowing back along the nipple according to an exemplary embodiment of the present disclosure may include fitting the volume part to the mounting mount to fasten the anti-release projection which is formed on the outer circumferential surface of the volume part to the mounting groove which is disposed inside the mounting mount.

In addition, before performing the fitting of the volume part to the mounting mount, an epoxy-based adhesive agent may be applied to the outer circumferential surface of the volume part. After performing the fitting of the volume part to the mounting mount, the volume part and the mounting mount may be heat-treated in an oven. The method may further include connecting the hose to the connection part, and the connecting of the hose to the connection part may include fitting the hose to the connection part, and mounting a clip to the overlapping portion between the hose and the connection part.

According to the intake structure of preventing the engine oil from flowing back along the nipple and the method of mounting the nipple to the intake structure of preventing the engine oil from flowing back along the nipple according to an exemplary embodiment of the present disclosure provided as described above, since the pocket part may be formed on the inner sidewall surface of the intake hose, the oil contained in the blow-by gas may be collected in the pocket part even if a part of the blow-by gas flows back along the inner sidewall surface of the intake hose based on the running state, and thus, the oil contained in the blow-by gas may be prevented from flowing into the fresh air nipple.

In addition, even if the oil exists in the blow-by gas recirculated to the intake hose through the recirculation nipple, the oil may be collected in the pocket part, or condensed in the protrusion which is formed on the surface of the fresh air nipple, thereby preventing the oil existing in the recirculated blow-by gas from flowing into the fresh air nipple. Since the perforated resonator is mounted to the intake hose, it may be possible to reduce the generation of noise caused by the intake air, and to prevent the oil from flowing into the air cleaner from the intake hose. In addition, contamination of the air cleaner by the oil may be prevented, and the fresh air supply to the brake booster may be prevented from being blocked.

BRIEF DESCRIPTION OF THE DRAWINGS

The objects, features and advantages of the present disclosure will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an intake structure of preventing engine oil from flowing back along a nipple and a method of mounting the nipple to the intake structure of preventing the engine oil from flowing back along the nipple according to an exemplary embodiment of the present disclosure will be described with reference to the accompanying drawings.

Figure 2:
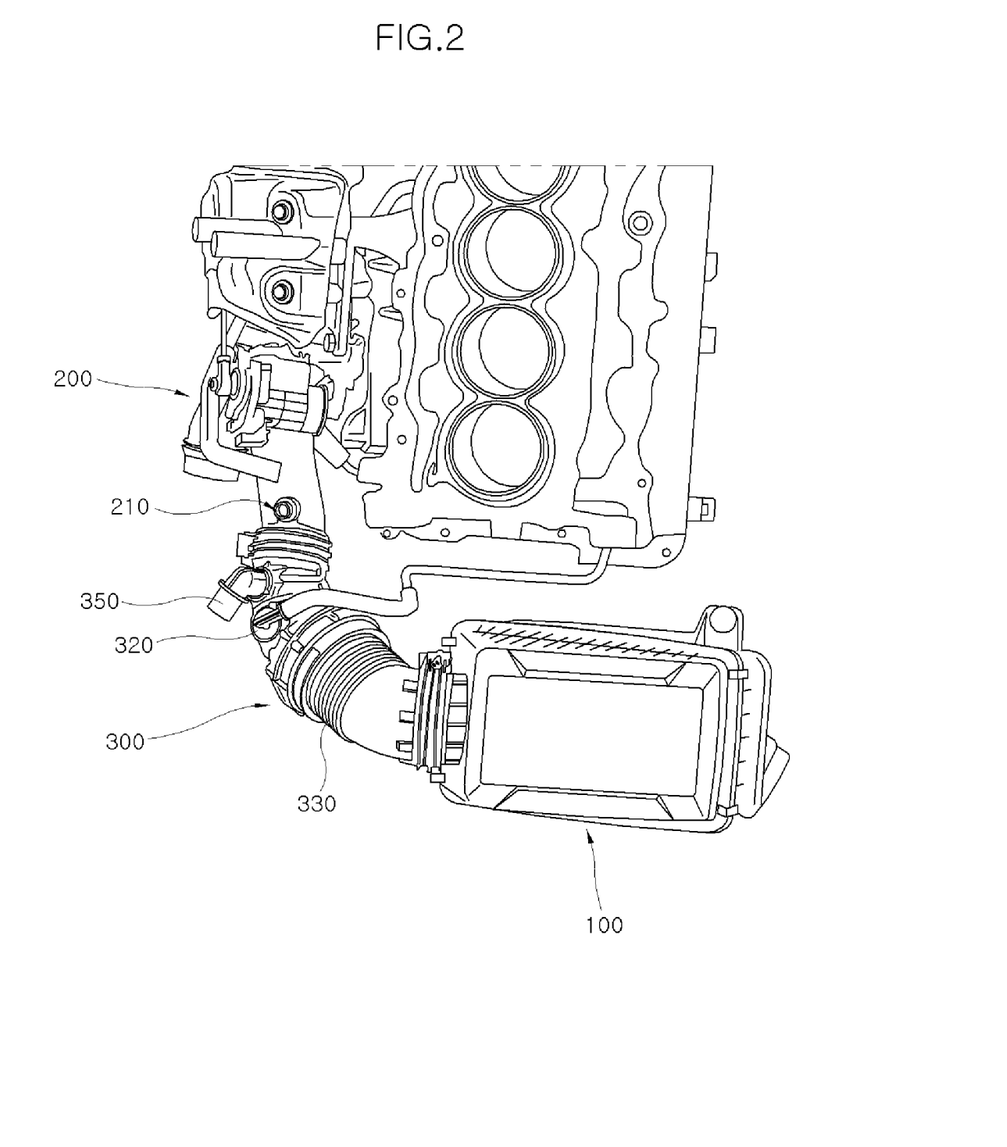
FIGS. 2 to 4 are exemplary diagrams illustrating an intake structure of preventing engine oil from flowing back along a nipple according to an exemplary embodiment of the present disclosure.
Figure 3:
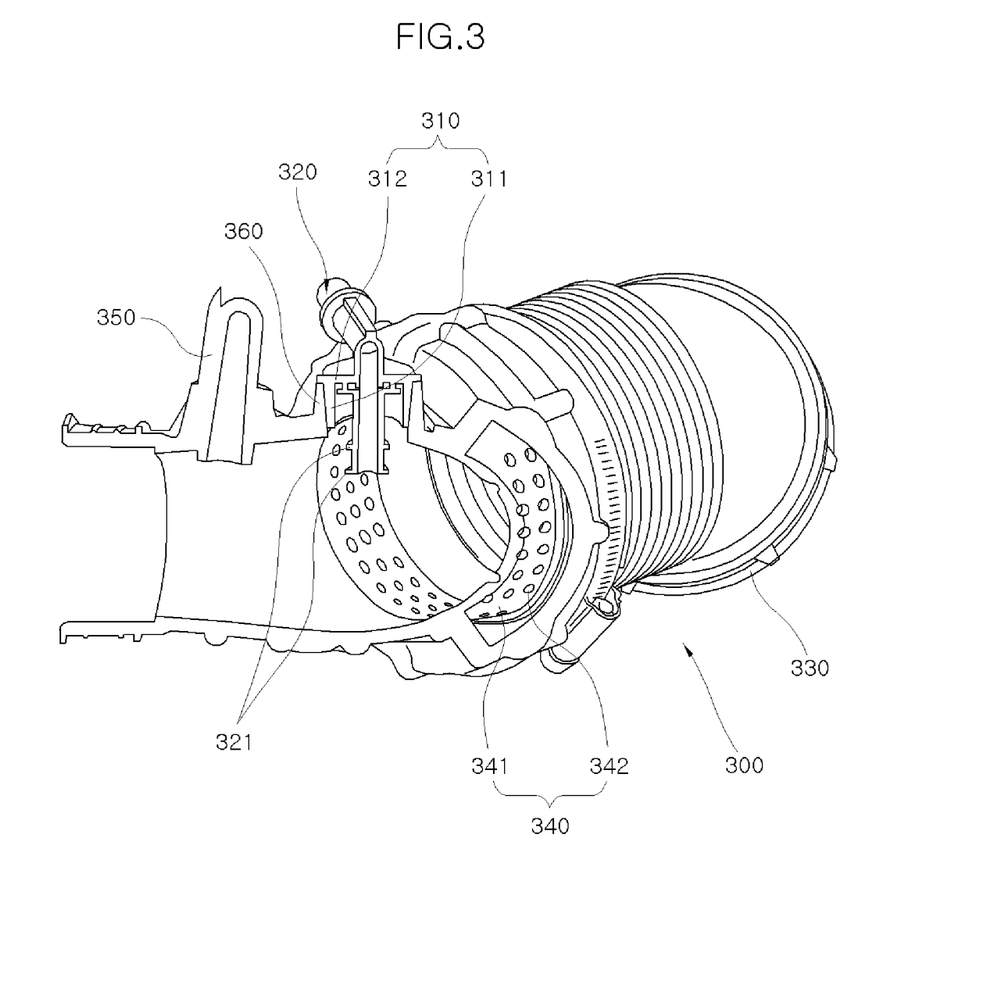
Figure 4:
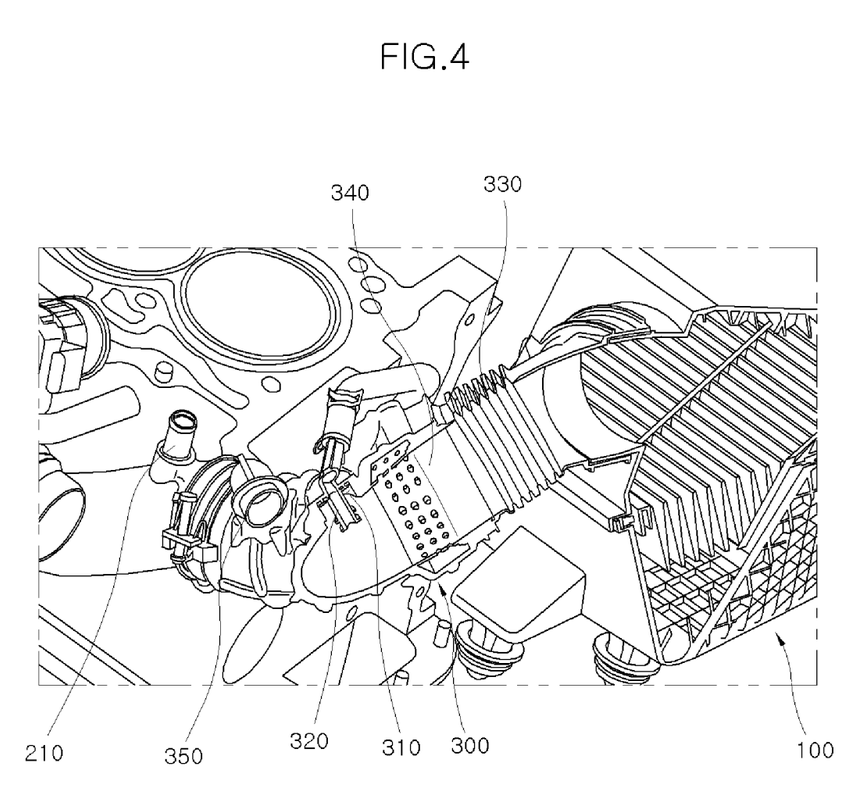

As illustrated in FIGS. 2 to 4, an intake structure of preventing engine oil from flowing back along a nipple according to an exemplary embodiment of the present disclosure may include an intake hose 300 mounted between an air cleaner 100 and a compressor 200 of a turbo charger. A breather nipple 210 into which blow-by gas flows may be mounted at one side of the compressor 200 of the turbo charger. A pocket part 310 in which the oil contained in the blow-by gas is collected may be formed on the inner sidewall surface of the intake hose 300.

The pocket part 310 may include a volume part 311 (e.g., a container or volume compartment) fixed to a mounting mount 360 formed on the intake hose 300, and a bottom part 312 mounted to the end portion of the volume part 311 to seal the volume part 311. The volume part 311 may have the depth from the inner sidewall surface of the intake hose 300 to the bottom part 312. The volume part 311 and the bottom part 312 may have a bowl shape.

The intake hose 300 may be mounted with a fresh air nipple 320 configured to supply fresh air (e.g., newly suctioned air) to an engine in which the blow-by gas is generated. The fresh air nipple 320 may include a connection part 322 disposed outside the intake hose 300, an extension part 323 that extends from the connection part 322 and is disposed inside the volume part 311, and a protrusion part 324 that extends from the extension part 323 into the intake hose 300. The extension part 323 may penetrate the center of the bottom part 312. The pocket part 310 and the fresh air nipple 320 may be integrated with each other.

Based on the running state, when a part of the blow-by gas flows back along the inner sidewall surface of the intake hose 300, the flowing-back blow-by gas reaches the pocket part 310. When the oil is contained in the blow-by gas, the oil may be collected in the pocket part 310. When the oil collected in the pocket part 310 reaches a threshold amount, the oil falls freely, and may flow into the engine by the engine negative pressure.

Figure 5:
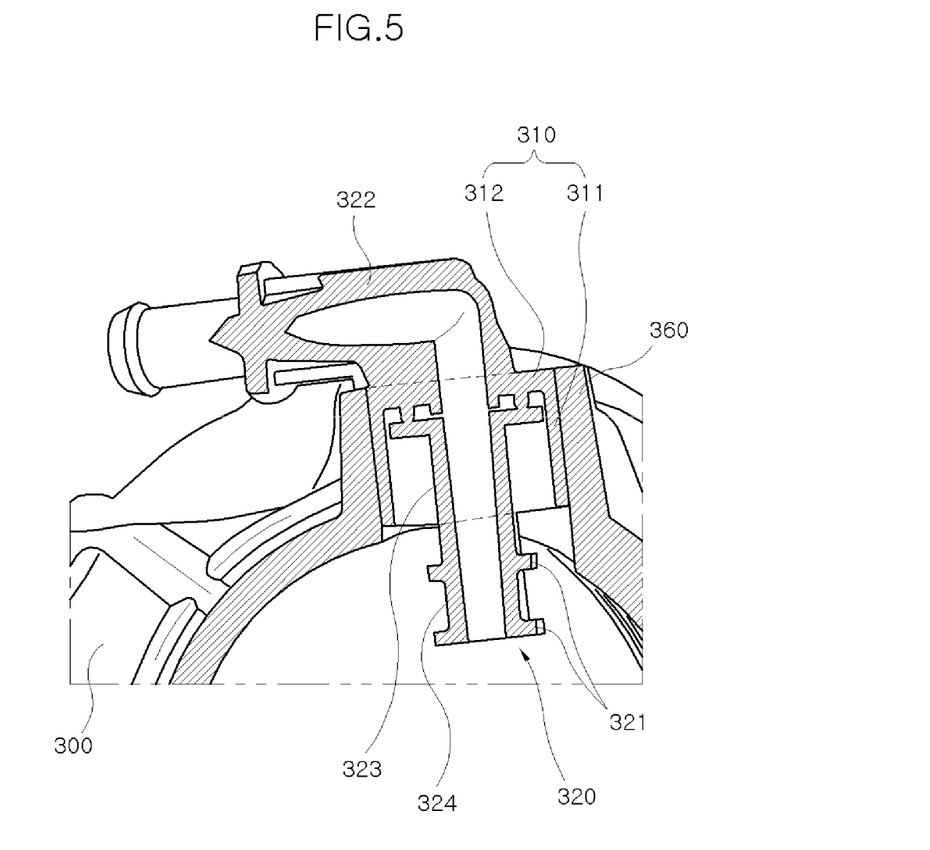
FIG. 5 is an exemplary diagram illustrating a fresh air nipple of FIG. 2 according to an exemplary embodiment of the present disclosure.

As illustrated in FIG. 5, the total length of the extension part 323 and the protrusion part 324 may be designed to be greater than the depth of the pocket part 310, and less than the radius of the inner diameter of the intake hose 300. Accordingly, even if a part of the blow-by gas flows back along the inner sidewall surface of the intake hose 300 based on the running state, the opened end portion of the protrusion part 324 may be not affected by the flowing-back blow-by gas.

A projection 321 may be formed on the protrusion part 324. The projection 321 may be continuously formed on the outer circumferential surface of the protrusion part 324 at a right angle with respect to the longitudinal central axis of the protrusion part 324. The projection 321 may be formed in a ring shape on the outer circumferential surface of the protrusion part 324. Two or more projections 321 may be formed to have spacing distances from the end portion of the protrusion part 324 toward the inner surface of the intake hose 300.

When oil exists in the blow-by gas recirculated to the intake hose 300 through a recirculation nipple 350, the oil may be condensed on the projection 321 which is formed on the surface of the fresh air nipple 320. Accordingly, the oil existing in the recirculated blow-by gas may be prevented from flowing into the fresh air nipple 320. The oil condensed on the projection 321 falls freely when becoming a sufficient amount, and may flow into the engine by the engine negative pressure. The oil existing in the recirculated blow-by gas may also be collected in the pocket part 310. In addition, the oil falling from the pocket part 310 may be formed on the projection 321. After falling from the pocket part 310, the oil formed on the projection 321 may also fall freely when reaching the threshold amount, and may flow into the engine by the engine negative pressure.

Figure 6:
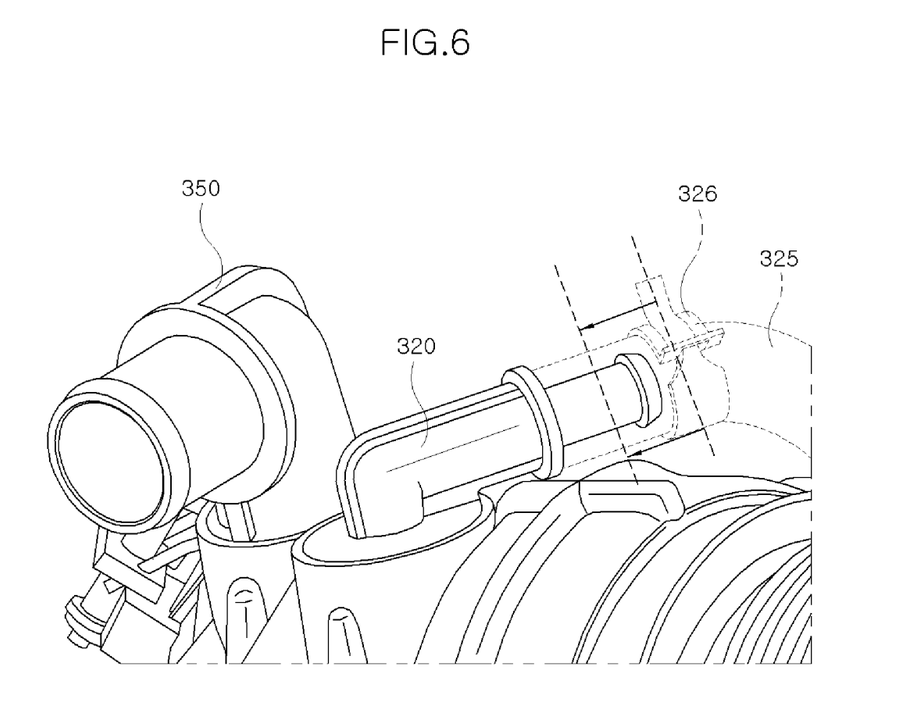
FIGS. 6 and 7 are exemplary diagrams illustrating the connection between the fresh air nipple and a fresh air hose according to an exemplary embodiment of the present disclosure.

As illustrated in FIG. 6, the fresh air hose 325 may be mounted to one side end portion of the fresh air nipple 320 disposed outside the intake hose 300. A ring-shaped clip 326 may be mounted to the overlapping portion between the fresh air nipple 320 and the fresh air hose 325.

Figure 7:
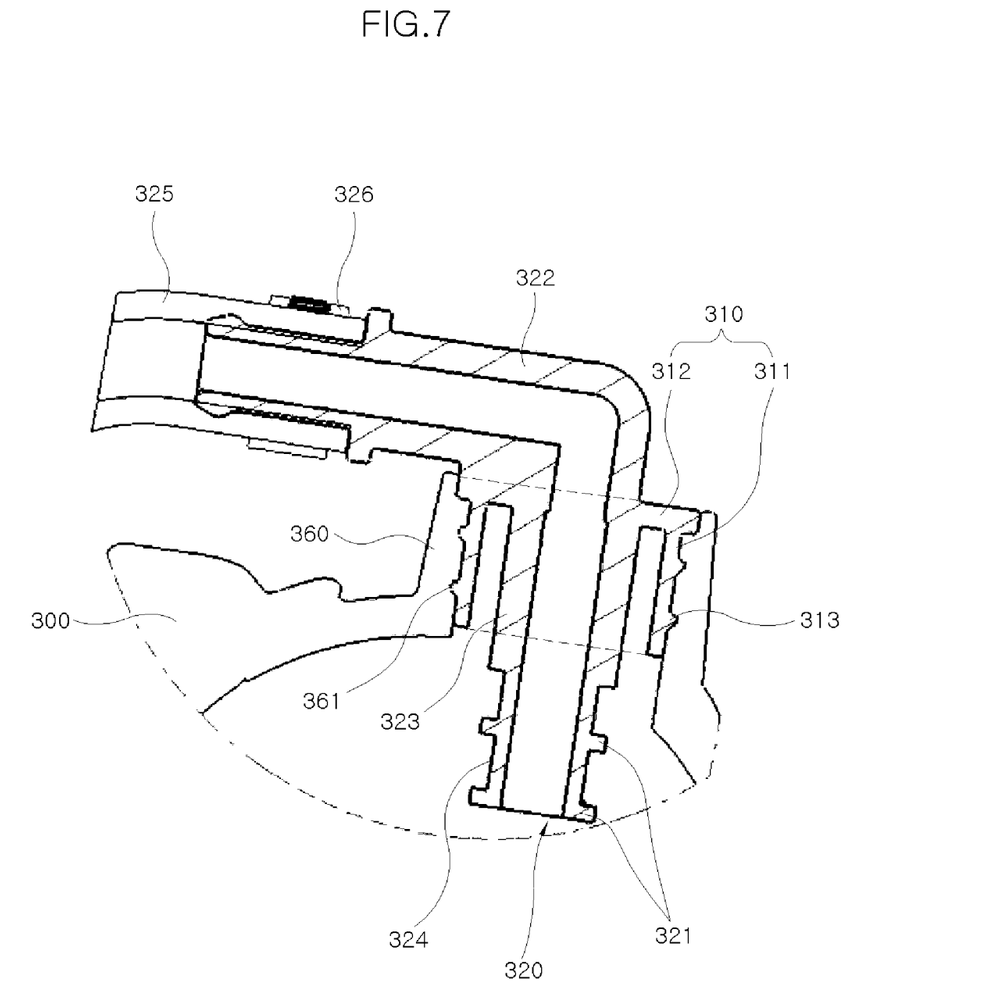

As illustrated in FIG. 7, the fresh air nipple 320 may be designed integrally with the pocket part 310. An epoxy-based adhesive agent may be applied to the outside of the pocket part 310, which is mounted to a mounting aperture formed in the intake hose 300. In addition, the intake hose 300 may be mounted with the fresh air nipple 320 and the pocket part 310 by the heat-treatment in an oven at about 150 degrees Celsius.

Meanwhile, as illustrated in FIG. 3, the recirculation nipple 350, in which the intake air compressed by the compressor 200 of the turbo charger is recirculated to the intake hose 300, may be mounted to the intake hose 300. The recirculation nipple 350 may be disposed between the breather nipple 210 and the fresh air nipple 320. The recirculation nipple 350 may be mounted to the intake hose 300 to protrude toward the inside of the intake hose 300. To minimize the air flow resistance inside the intake hose 300, the length of the recirculation nipple 350 that protrudes from the inner sidewall surface of the intake hose 300 may be about 5 mm to 10 mm.

The end portion of the fresh air nipple 320 may be disposed closer to the center of the intake hose 300 than the end portion of the recirculation nipple 350 and thus, the recirculated blow-by gas may flow back along the inner sidewall surface of the intake hose 300 to prevent the recirculated blow-by gas from flowing into the fresh air nipple 320. The recirculation nipple 350 may be disposed inside the intake hose 300 so that the intake air flow direction and the recirculated blow-by gas flow direction coincide with each other. The recirculation nipple 350 may be mounted to the intake hose 300 and thus, the end portion of the recirculation nipple 350 may be inclined closer to the compressor 200 of the turbo charger than the coupled site between the intake hose 300 and the recirculation nipple 350.

The recirculated blow-by gas flowing into the intake hose 300 through the recirculation nipple 350 may be discharged in an inclined shape from the center portion of the intake hose 300 toward the compressor 200 of the turbo charger by the length and the slope of the recirculation nipple 350. As illustrated in FIGS. 3 and 4, the end portion of the intake hose 300 may include a buffer part 330 configured to absorb the vibration of the engine. The perforated resonator 340 may be mounted to the intake hose 300 to approach the buffer part 330. The perforated resonator 340 may be disposed in the intake hose 300 closer to the air cleaner 100 than the pocket part 310.

The perforated resonator 340 may include a tubular body part 341 fixed to the inner surface of the intake hose 300. The body part 341 may be formed with a plurality of apertures 342 which penetrate the body part 341. The recirculated blow-by gas may be prevented from flowing back from the compressor 200 of the turbo charger to the intake hose 300 by the perforated resonator 340, or the oil existing in the blow-by gas recirculated from the intake manifold side, which is the rear end of the compressor 200 of the turbo charger, to the intake hose 300, which is the front end of the compressor 200 of the turbo charger, may be prevented from flowing into the air cleaner 100 from the intake hose 300. The intake air noise may be reduced by the perforated resonator 340.

Figure 8:
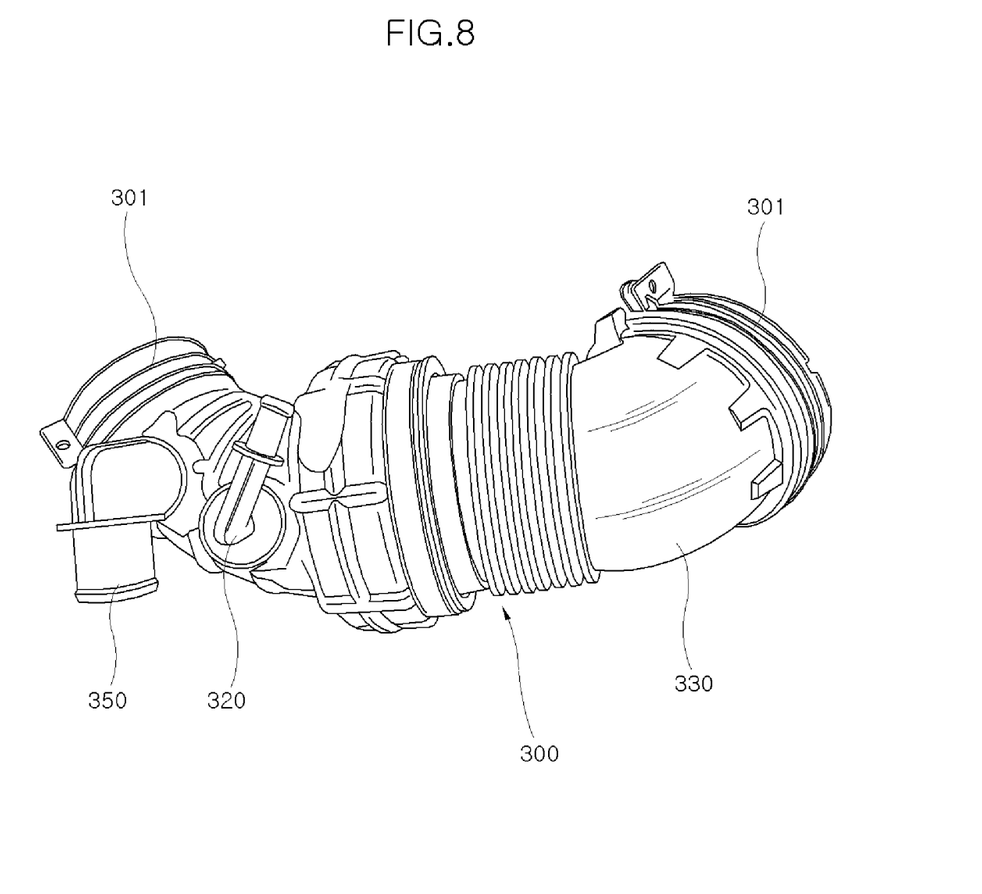
FIG. 8 is an exemplary diagram illustrating an intake hose according to an exemplary embodiment of the present disclosure.

Meanwhile, as illustrated in FIG. 8, wrinkles 301 may be formed on the surface of the intake hose 300. When the intake hose 300 is connected to the air cleaner 100 or the compressor 200 of the turbo charger, the connection site which protrudes from the air cleaner 100 or the compressor 200 of the turbo charger and the site where the wrinkles 301 may be formed overlap with each other, and the ring-shaped clip may be mounted to the overlapping portion, and thus, the intake hose 300 may be connected to the air cleaner 100 or the compressor 200 of the turbo charger.

Figure 9:
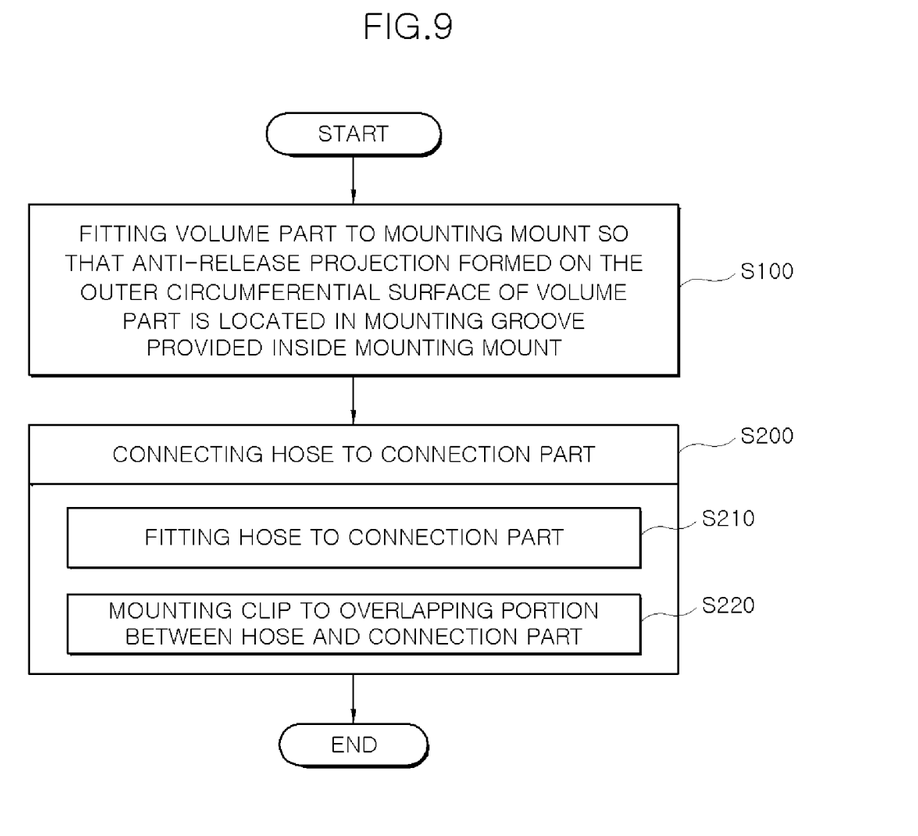
FIG. 9 is a flowchart illustrating a method of mounting the nipple to the intake structure of preventing the engine oil from flowing back along the nipple according to an exemplary embodiment of the present disclosure.

According to the flowchart illustrated in FIG. 9, the intake structure of preventing the engine oil from flowing back along the nipple according to an exemplary embodiment of the present disclosure configured as described above may be mounted with the fresh air nipple. As illustrated in FIG. 9, a method of mounting the nipple to the intake structure of preventing the engine oil from flowing back along the nipple according to an exemplary embodiment of the present disclosure may include fitting the volume part 311 to the mounting mount 360 to dispose an anti-release projection 313 which is formed on the outer circumferential surface of the volume part 311 in the mounting groove 361 which is provided inside the mounting mount 360 (S100), and connecting the hose 325 to the connection part 322 (S200).

Before performing the fitting of the volume part 311 to the mounting mount 360 (S100), an epoxy-based adhesive agent may be applied to the outer circumferential surface of the volume part 311. After performing the fitting of the volume part 311 to the mounting mount 360 (S100), the volume part 311 and the mounting mount 360 may be heat-treated in an oven. The heat-treatment temperature may be about 150 degrees Celsius. Further, the connecting of the hose 325 to the connection part 322 (S200) may include fitting the hose 325 to the connection part 322 (S210), and mounting the clip 326 to the overlapping portion between the hose 325 and the connection part 322 (S220). In the mounting of the clip 326 to the overlapping portion between the hose 325 and the connection part 322 (S220), the clip 326 may be moved from the center side of the hose 325 toward the overlapping portion.

According to the intake structure of preventing the engine oil from flowing back along the nipple and the method of mounting the nipple to the intake structure of preventing the engine oil from flowing back along the nipple according to an exemplary embodiment of the present disclosure provided as described above, since the pocket part 310 may be formed on the inner sidewall surface of the intake hose 300, the oil contained in the blow-by gas may be collected in the pocket part 310 even if a part of the blow-by gas flows back along the inner sidewall surface of the intake hose 300 based on the running state, such that the oil contained in the blow-by gas may be prevented from flowing into the fresh air nipple 320.

In addition, even if the oil exists in the blow-by gas recirculated to the intake hose 300 through the recirculation nipple 350, the oil may be collected in the pocket part 310, or condensed in the projection 321 which is formed on the surface of the fresh air nipple 320, such that the oil existing in the recirculated blow-by gas may be prevented from flowing into the fresh air nipple 320. Since the perforated resonator 340 may be mounted to the intake hose 300, it may be possible to reduce the generation of noise caused by the intake air, and to prevent the oil from flowing into the air cleaner 100 from the intake hose 300.

What is claimed is:

1. An intake structure of a vehicle, comprising:
an intake hose mounted between an air cleaner and a compressor of a turbo charger; and
a pocket part formed on the inner sidewall surface of the intake hose to collect engine oil contained in a blow-by gas flowing in the intake hose,
wherein the pocket part includes:
a volume part fixed to a mounting mount formed on the intake hose; and
a bottom part mounted to the end portion of the volume part to seal the volume part,
wherein the volume part has the depth from the inner sidewall surface of the intake hose to the bottom part,
wherein a fresh air nipple, configured to supply fresh air to an engine in which the blow-by gas is generated, is mounted to the intake hose, wherein the fresh air nipple includes:
a connection part disposed outside the intake hose;
an extension part that extends from the connection part and is disposed inside the volume part; and
a protrusion part that extends from the extension part into the intake hose,
wherein the extension part penetrates the center of the bottom part, and
wherein the pocket part and the fresh air nipple are integrated,
wherein the intake hose is mounted with a recirculation nipple in which the intake air compressed by the compressor of the turbo charger is recirculated to the intake hose, wherein one side of the compressor of the turbo charger is mounted with a breather nipple into which the blow-by gas flows, and
wherein the recirculation nipple is disposed between the breather nipple and the fresh air nipple.

2. The intake structure of claim 1, wherein the total length of the extension part and the protrusion part is greater than the depth of the pocket part, and is less than the radius of the inner diameter of the intake hose.

3. The intake structure of claim 2, wherein a projection is formed on the protrusion part.

4. The intake structure of claim 3, wherein the projection is continuously formed at a right angle with respect to the longitudinal center axis of the protrusion part on the outer circumferential surface of the protrusion part.

5. The intake structure of claim 4, wherein two or more projections are formed to have spacing distances from the end portion of the protrusion part toward the inner sidewall surface of the intake hose.

6. The intake structure of claim 1, wherein the end portion of the intake hose includes a buffer part configured to absorb the vibration of the engine, and wherein a perforated resonator is mounted to the intake hose to approach the buffer part.

7. The intake structure of claim 6, wherein the perforated resonator includes a tubular body part fixed to the inner surface of the intake hose, and wherein the body part is formed with a plurality of apertures which penetrate the body part.

8. The intake structure of claim 6, wherein the perforated resonator is disposed closer to the air cleaner than the pocket part.

9. The intake structure of claim 1, wherein the recirculation nipple is mounted to the intake hose to protrude toward the inside of the intake hose.

10. The intake structure of claim 9, wherein the length of the recirculation nipple which protrudes from the inner sidewall surface of the intake hose is about 5 mm to 10 mm.

11. The intake structure of claim 9, wherein the end portion of the fresh air nipple is disposed closer to the center portion of the intake hose than the end portion of the recirculation nipple.

12. The intake structure of claim 1, wherein the recirculation nipple is mounted to the intake hose and the end portion of the recirculation nipple disposed inside the intake hose is inclined closer to the compressor of the turbo charger than the coupled site between the intake hose and the recirculation nipple.

13. The intake structure of claim 1, wherein an anti-release projection is formed on the outer surface of the volume part, and wherein the inner surface of the mounting mount is formed with a mounting groove which is fastened to the anti-release projection.

14. A method of mounting a nipple to an intake structure of claim 13, the method comprising:
fitting the volume part to the mounting mount to fasten the anti-release projection which is formed on the outer circumferential surface of the volume part to the mounting groove which is provided inside the mounting mount.

15. The method of claim 14, wherein before performing the fitting of the volume part to the mounting mount, an epoxy-based adhesive agent is applied to the outer circumferential surface of the volume part.

16. The method of claim 15, wherein after performing the fitting of the volume part to the mounting mount, the volume part and the mounting mount are heat-treated in an oven.

17. The method of claim 14, further comprising:
connecting the hose to the connection part, wherein the connecting of the hose to the connection part includes:
fitting the hose to the connection part; and
mounting a clip to an overlapping portion between the hose and the connection part.

\* \* \* \* \*